United States Patent
Ballman

[11] 3,733,535
[45] May 15, 1973

[54] BATTERY CHARGER
[76] Inventor: Gray C. Ballman, 30 Portland Drive, St. Louis, Mo. 63121
[22] Filed: Jan. 3, 1972
[21] Appl. No.: 214,562

[52] U.S. Cl............320/40, 320/DIG. 2, 323/22 SC
[51] Int. Cl................................................H02j 7/10
[58] Field of Search...................320/DIG. 2, 39, 40; 323/22 SC, 36, 39; 307/133, 252 VA

[56] References Cited
UNITED STATES PATENTS

| | | | |
|---|---|---|---|
| 3,469,175 | 9/1969 | Kirk | 323/22 SC |
| 3,497,791 | 2/1970 | Moore | 323/22 SC |
| 3,487,284 | 12/1969 | Cady | 320/DIG. 2 |
| 3,193,750 | 7/1965 | Chait | 320/40 X |

Primary Examiner—J. D. Miller
Assistant Examiner—Robert J. Hickey
Attorney—Joseph A. Fenlon, Jr.

[57] ABSTRACT

This invention utilizes an SCR controlled charging circuit in which the on-off condition of the SCR is controlled by a transistor which conducts responsive to battery terminal voltage and which utilizes a capacitor between the gate lead of the SCR and the anode of the SCR to anticipate voltage fluctuations and eliminate r-f interference.

5 Claims, 1 Drawing Figure

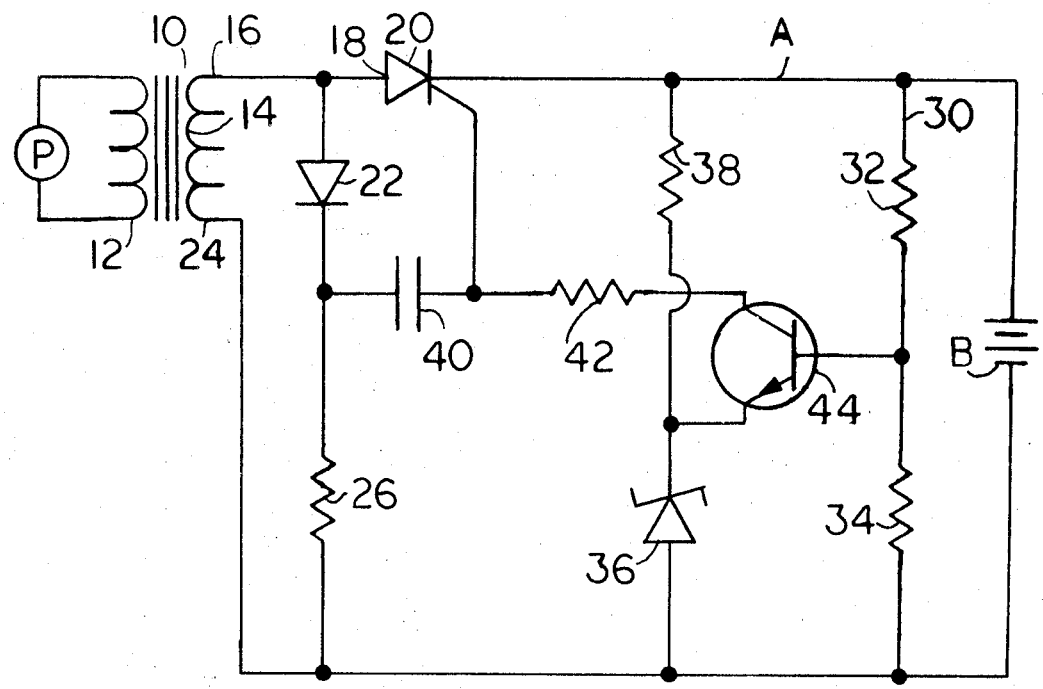

BATTERY CHARGER

It is the object of this invention to provide a charging circuit which is not affected by high frequency noise or r-f interference.

With the above and other objects in view, which will become immediately apparent upon reading this specification, my invention resides in the unique and novel form, construction, arrangement and combination of the various parts shown in the drawings, described in the specification, and claimed in the claims.

In the drawings:

FIG. 1 is an electrical schematic diagram of a preferred embodiment of my invention.

Referring now in more detail and by reference character to FIG. 1, A designates a Float Charger adapted for receiving AC power from a source of AC power P and thereafter rectifying such power and utilizing such rectified power to maintain, at a substantially constant potential, the terminal voltage of a battery B.

The circuit A includes a transformer 10 having a primary winding 12 coupled to the power source P, and a secondary winding 14 one end 16 of which is connected to the anode 18 of an SCR 20, and the anode of a blocking diode 22. The other end 24 of the secondary winding 14 is connected to the negative terminal of the Battery B and serves as a ground. A resistor 26 is interposed between the blocking diode 22 and ground.

A voltage divider circuit 30 is connected across the battery B and includes a pair of resistors 32, 34, of preselected magnitude in series. Also connected across the battery B is a Zener 36 in series with a resistor 38.

Disposed between the common connection of the diode 22 and the resistor 26 and the gate of the SCR 20 is a capacitor 40. Also connected to the gate of the SCR 20 is one end of a resistor 42, the other end of which is connected to the collector of a transistor 44. The base of the transistor 44 is connected to the common connection between the resistors 32, 34, and the emitter of the transistor 44 is connected to the anode of the Zener 36.

OPERATION

The entire operation is controlled by the terminal voltage of the battery B as presented to the voltage divider circuit 30. First, it should be noted that current continuously flows from the battery through the Zener 36, whereby the voltage at the emitter of the transistor 44 is maintained at a constant potential with respect to the negative terminal of the battery B. It should be also noted that as long as the terminal voltage of the battery B is below the desired voltage, the voltage presented to the base of the transistor 44 by the divider circuit 30 will not be sufficient to place the transistor 44 in conduction. When the transistor 44 is not in conduction, charging current will flow through the SCR 20 on every positive half cycle of alternating current. As the battery B accepts a charge, the voltage across its terminals increases and correspondingly the voltage at the base of the transistor 44 (the voltage divider circuit 30) also increases. At the desired terminal voltage of the battery B, as determined by the preselected magnitudes of the resistors 32, 34, the transistor 44 will go into conduction. The transistor 44 remains in conduction as long as the battery B exceeds the desired charge level. It is interesting to note the function of the capacitor 40 during conduction of the transistor 44. First, it should be noted that the voltage of the gate of the SCR 20 is substantially the voltage of the base of the transistor 44 during conduction, and the SCR 20 becomes biased substantially below cutoff. Even though there is no current flowing from anode to cathode of the SCR 20 during cutoff, there is cathode to gate leakage current in sufficient quantity to maintain conduction of the transistor 44. During the positive half cycle of alternating current from the power source P, the plate of the capacitor 40 nearest the common connection of the blocking diode 22 and the resistor 26 builds up a positive charge with respect to the other plate of the capacitor 40 which retains the potential of the gate of the SCR 20. During the negative half cycle of alternating current, the plates of the capacitor 40 reverse polarity, the plate nearest the blocking diode 22 approaching ground potential, and the other plate retaining the voltage at the gate of the SCR 20. Thus it can be seen that while the transistor 44 is conducting, the capacitor 40 acts to retain the gate of the SCR 20 at cutoff notwithstanding the presence of other varying voltages in the circuit. This has been found to be true also where high frequency noise and r-f interference is concerned. In short, the capacitor 40 makes the charging operation unaffected by noise and interference, and makes the charge particularly suited for maritime use. When the battery B terminal voltage decreases, the transistor 44 will go out of conduction and SCR 20 will go back into conduction thus assuring the maintenance of the battery voltage at a substantially constant value.

It should be understood that changes, alterations and modifications in the form, construction, arrangement, and combination of the various parts may be made and substituted for those herein shown and described without departing from the operation and principles of my invention.

Having thus described my invention, what I claim and desire to secure by Letters Patent is stated in the following claims:

1. A battery charger comprising a pair of terminals attached to the positive and negative poles of a battery;
   a voltage divider circuit including a pair of resistors in series across said terminals and being provided with a central voltage reference point;
   Zener reference circuit also connected across the terminals and including a Zener in series with a dropping resistor, and also including a cathode directly connected to the negative battery terminal;
   transformer means coupled to a source of alternating current power and including a secondary winding;
   a blocking diode in series with a fourth resistor, all connected across the secondary winding, the cathode of the blocking diode being connected to one terminal of the fourth resistor, and the other terminal of said fourth resistor being connected to one terminal of the secondary winding and the negative terminal of the battery;
   an SCR including an anode connected to the other terminal of the secondary winding and to the anode of the blocking diode, said SCR also including a cathode connected to the positive battery terminal, and further including a gate lead;
   a capacitor connected between the cathode of the blocking diode and the gate lead;
   and transistor means including a base connected to the central voltage reference point, an emitter connected to the Zener anode, and a collector operatively connected to the gate lead through a fifth resistor;

said transistor means being normally non-conducting but said central voltage reference point and Zener reference voltage being preselected so that the transistor means will go into conduction when the battery attains a terminal voltage indicative of a fully charged condition.

2. A battery charger comprising a pair of terminals attached to the positive and negative poles of a battery, first switching means including a control electrode for supplying charging current from a source to the battery terminals, second switching means operatively connected to the control electrode and to the battery terminals for actuating the flow of charging current to the battery through the first switching means when the battery terminal voltage is below a predetermined magnitude and also for stopping the flow of charging current through the first switching means when the battery terminal voltage exceeds that predetermined magnitude, a diode and resistor connected in series across the source, and a capacitor connected across the control electrode and the common connection of the diode and the resistor.

3. The charger of claim 2 wherein the first switching means comprises an SCR with the control electrode being the gate thereof.

4. The charger of claim 2 wherein the first switching means comprises an SCR with the control electrode being the gate thereof, and the second switching means is a normally off transistor, which derives its turn-on voltage from the terminals of the battery as the battery takes the charge, the collector of the transistor being directly connected to the gate of the SCR, and the collector current being derived from the cathode to gate leakage of the SCR.

5. The charger of claim 2 wherein the first switching means comprises an SCR with the control electrode being the gate thereof, the second switching means is a normally off transistor, which derives its turn-on voltage from the terminals of the battery as the battery takes the charge, the collector of the transistor being directly connected to the gate of the SCR, and the collector current being derived from the cathode to gate leakage of the SCR, the anode of the diode is directly connected to the anode of the SCR, and the capacitor is connected to the cathode of the diode.

* * * * *